United States Patent [19]

Igashira et al.

[11] 4,411,242
[45] Oct. 25, 1983

[54] METHOD AND APPARATUS FOR CONTROLLING EGR IN INTERNAL COMBUSTION ENGINE

[75] Inventors: Toshihiko Igashira, Toyokawa; Takeshi Tanaka, Toyohashi; Kiyonori Sekiguchi, Aichi; Hiromichi Yanagihara, Gotenba, all of Japan

[73] Assignees: Nippon Soken, Inc., Nishio; Toyota Jidosha Kogyo Kabushiki Kaisha, Toyota, both of Japan

[21] Appl. No.: 364,456

[22] Filed: Apr. 1, 1982

[30] Foreign Application Priority Data

Apr. 3, 1981 [JP] Japan ............................... 56-49291
Jun. 9, 1981 [JP] Japan ............................... 56-95522
Feb. 16, 1982 [JP] Japan ............................... 57-23465

[51] Int. Cl.³ .............................................. F02M 25/06
[52] U.S. Cl. ..................................... 123/569; 123/571
[58] Field of Search ...................... 123/571, 568, 569

[56] References Cited

U.S. PATENT DOCUMENTS

| 3,915,134 | 10/1975 | Young | 123/569 |
| 4,280,470 | 7/1981 | Ueba | 123/569 |
| 4,286,567 | 9/1981 | Ueba | 123/569 |
| 4,295,456 | 10/1981 | Nomura et al. | 123/569 |

FOREIGN PATENT DOCUMENTS

| 2750537 | 5/1979 | Fed. Rep. of Germany | 123/569 |
| 2443582 | 8/1980 | France | 123/569 |

*Primary Examiner*—Wendell E. Burns
*Attorney, Agent, or Firm*—Cushman, Darby & Cushman

[57] ABSTRACT

In a method for controlling the EGR in an internal combustion engine, the fuel amount detected by a sensor is used as the basis for the control of an EGR valve in line with a predetermined EGR rate equation.

8 Claims, 7 Drawing Figures

METHOD AND APPARATUS FOR CONTROLLING EGR IN INTERNAL COMBUSTION ENGINE

BACKGROUND OF THE INVENTION

The present invention relates to a method and apparatus for controlling exhaust gas recirculation (EGR) in an internal combustion engine, particularly in a diesel engine.

Generally, in diesel engines in which EGR systems are adopted, too small an amount of EGR results in unsatisfactory reduction of the nitrogen oxides ($NO_x$) in the exhaust gas, while too large an amount of EGR leads to an increase in the uncombusted hydrocarbons (HC) in the exhaust gas. Therefore, it has been reasoned that the optimum amount of EGR is the amount by which the weight of $NO_x$ and HC in the exhaust gas is minimized.

Prior art systems for controlling the EGR in diesel engines, however, have not been designed based on sufficient analysis of the characteristic relationship between the rate of excessive intake air and the ratio of the amount of fuel to total gas. Accordingly, no prior art system has managed to control the EGR to a satisfactory precision. This causes problems in the method and apparatus for controlling the EGR in diesel engines.

SUMMARY OF THE INVENTION

The main object of the present invention is to provide an improved method and apparatus for controlling the EGR in an internal combustion engine whereby the emission of harmful HC and $NO_x$ is minimized.

The method of the present invention is based on the regulation of the amount (E) of EGR in line with equation (1):

$$E = k_1 F^2 - k_2 F + k_3 \qquad (1)$$

In equation (1), E is the amount of the EGR per revolution of the engine in g/rev; F is the fuel amount per revolution of the engine in g/rev; and $k_1$, $k_2$ and $k_3$ are constants.

The method of the present invention is also based on the detection of the concentration of oxygen in the exhaust gas, the calculation of the rate of excessive air using the detected oxygen concentration, and the feedback of the calculated excessive air rate to the amount of EGR.

According to the fundamental form of the present invention, there is provided a method for controlling the EGR in an internal combustion engine comprising an EGR valve, means for driving the EGR valve, and means for detecting the fuel amount, wherein the EGR valve is driven by the driving means with the rate of EGR determined by the following equation:

$$e = \left( \frac{25 \times R_0^2}{G^2} \cdot a_1^2 \right) \cdot F^2 - \left( \frac{100 \times R_0}{G} \cdot a_1 \right) \cdot F + 100$$

where
e is the rate of EGR in %;
F is the fuel amount per revolution of the engine in g/rev;
$R_0$ is a constant between 14 and 15 as the stoichiometrical air-fuel ratio of the fuel;
G is the intake gas amount per revolution of the engine under typical running conditions in g/rev; and
$a_1$ is a constant between 2.5 and 3.6.

DETAILED DESCRIPTION OF THE PREFERRED EMBODIMENTS

First, the principle of the method according to the preferred embodiments of the present invention will be described. The inventors studies the optimum rate of EGR and found that there is a relationship between the ratio F/G of the amount of fuel to intake gas and the rate $\lambda(0)$ of the excessive air, as represented by equation (2).

$$\lambda(0) = a_1 - (R_0/4) \cdot a_1^2 \cdot (F/G) \qquad (2)$$

In equation (2), $\lambda(0)$ is the rate of the excessive air assuming only newly taken-in air, and not the air in the recirculated (EGR) gas, takes part in the combustion; F is the amount of the gas supplied per revolution of the engine in g/rev; G is the amount of intake gas per revolution of the engine in g/rev; $a_1$ is a constant between 2.56 and 3.52; and $R_0$ is a constant between 14 and 15 representing the stoichiometrical air-fuel ratio of the fuel.

Figure 1:
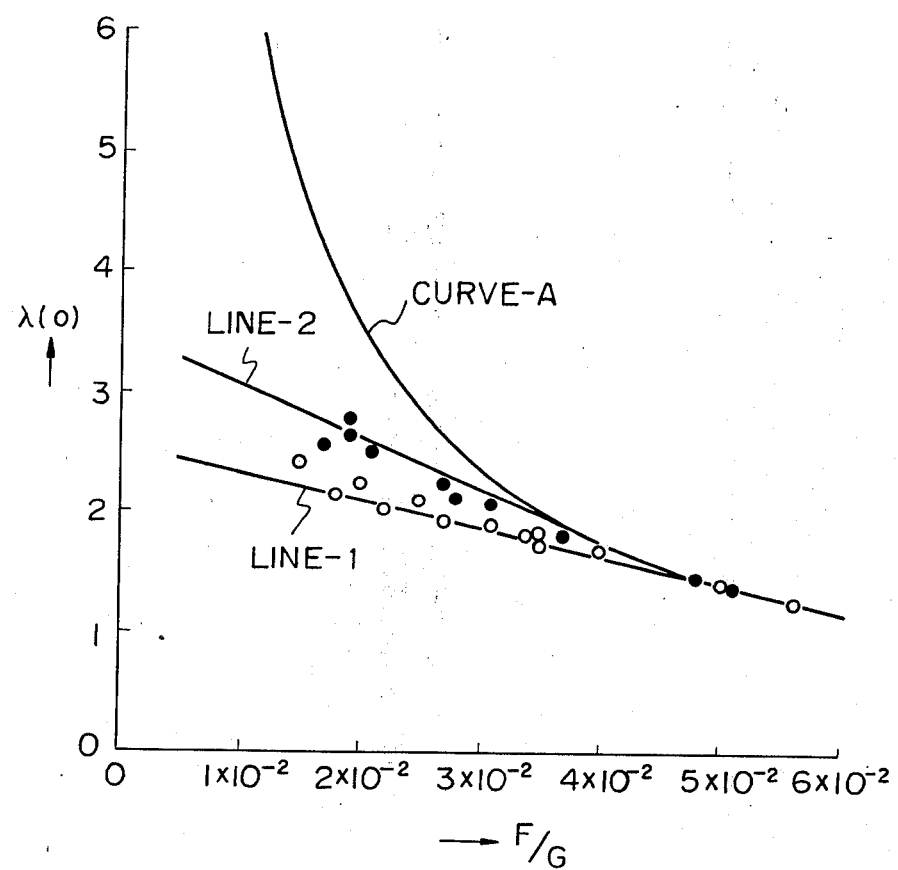
FIG. 1 illustrates characteristic curves of the relationship between the ratio of the fuel amount to intake gas amount and the rate of excessive air.

The relationship defined by equation (2) is illustrated in FIG. 1. Line 1 represents the case where $a_1 = 2.56$. Line 2 represents the case where $a_1 = 3.52$.

The white dots and the black dots indicate points obtained from experiments on the optimum EGR carried out by the inventors using two typical engines.

Equations (3), (4) and (5) correspond to line 1, line 2, and curve A, respectively;

$$\lambda(0) = 2.56 - 23.29(F/G) \qquad (3)$$

$$\lambda(0) = 3.52 - 44(F/G) \qquad (4)$$

$$\lambda(0) = \frac{1}{14.21 \times (F/G)} \qquad (5)$$

The inventors found that the points obtained from experiments on the optimum EGR using various kinds of engines satisfy the relationship of equation (2) and are distributed between line 1 and line 2 of FIG. 1.

Due to the characteristics of equation (2), both line 2 and line 1 are tangent to curve A, touching curve A at F/G=0.04 and at F/G=0.055, respectively. Curve A can be expressed by equation (6);

$$\lambda(0) = \frac{1}{R_0 \cdot (F/G)} \quad (6)$$

From equation (2), equation (7) representing the rate(e) of EGR is obtained;

$$e = \left( \frac{25 \times R_0^2}{G^2} \cdot a_1^2 \right) \cdot F^2 - \left( \frac{100 \times R_0}{G} \cdot a_1 \right) \cdot F + 100 \quad (7)$$

Figure 2:
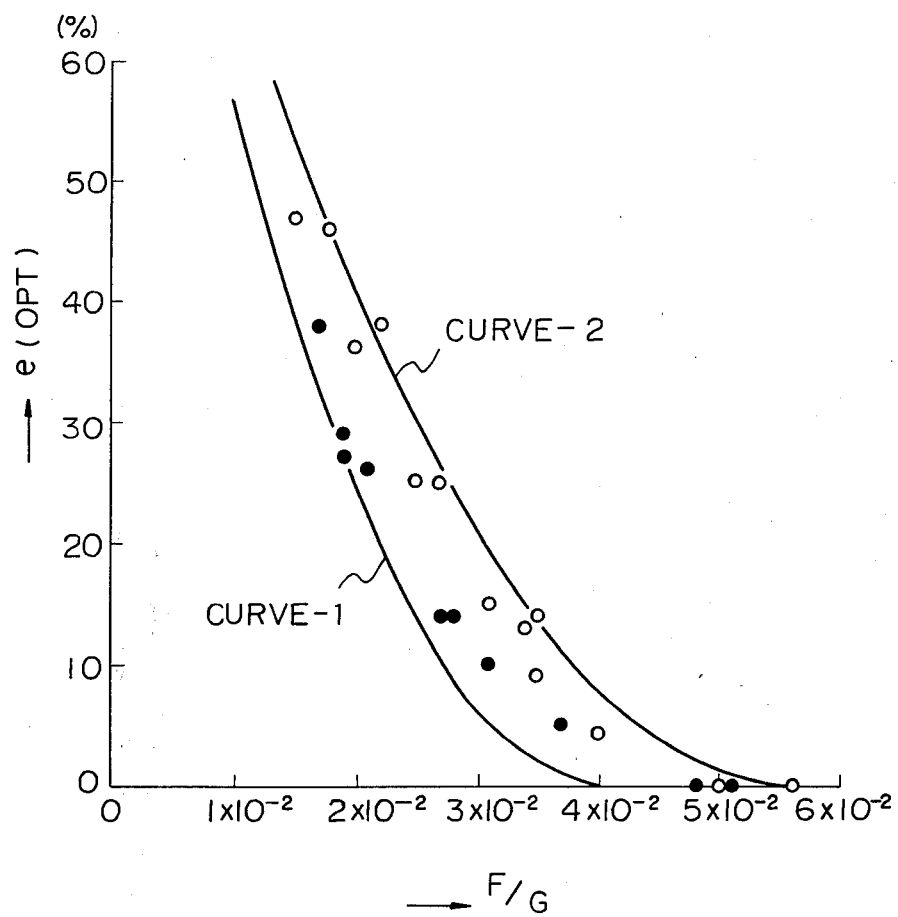
FIG. 2 illustrates characteristic curves of the relationship between the ratio of the fuel amount to intake gas amount and the rate of EGR.

The relationship defined by equation (7) is illustrated in FIG. 2. In FIG. 2, the abscissa represents F/G and the ordinate represents the optimum rate e(OPT) of EGR. Curve 1 represents the case where $a_1=3.52$. Curve 2 represents the case where $a_1=2.56$. Curve 1 and curve 2 correspond to equations (8) and (9) respectively;

$$e(OPT) = 62524(F/G)^2 - 5000(F/G) + 100 \quad (8)$$

$$e(OPT) = 33095(F/G)^2 - 3638(F/G) + 100 \quad (9)$$

The white dots and the black dots indicate the points obtained from experiments carried out by the inventors using two typical engines. The inventors found that the points obtained from experiments using various kinds of engines satisfy the relationship of equation (7) and are distributed between curve 1 and curve 2.

The rate (e) of EGR is represented by equation (10);

$$e = (E/G) \times 100 \quad (10)$$

In equation (10), e is the rate of EGR in %; E is the amount of EGR per revolution of the engine in g/rev; and G is the amount of the intake gas per revolution of the engine in g/rev.

The amount (E) of EGR is represented by equation (11);

$$E = \left( \frac{R_0^2}{4G} \cdot a_1^2 \right) \cdot F^2 - (R_0 \cdot a_1) \cdot F + G \quad (11)$$

Thus, control in accordance with equation (7), regarding the rate of EGR, corresponds to control in accordance with equation (11), regarding the amount of EGR.

Figure 3:
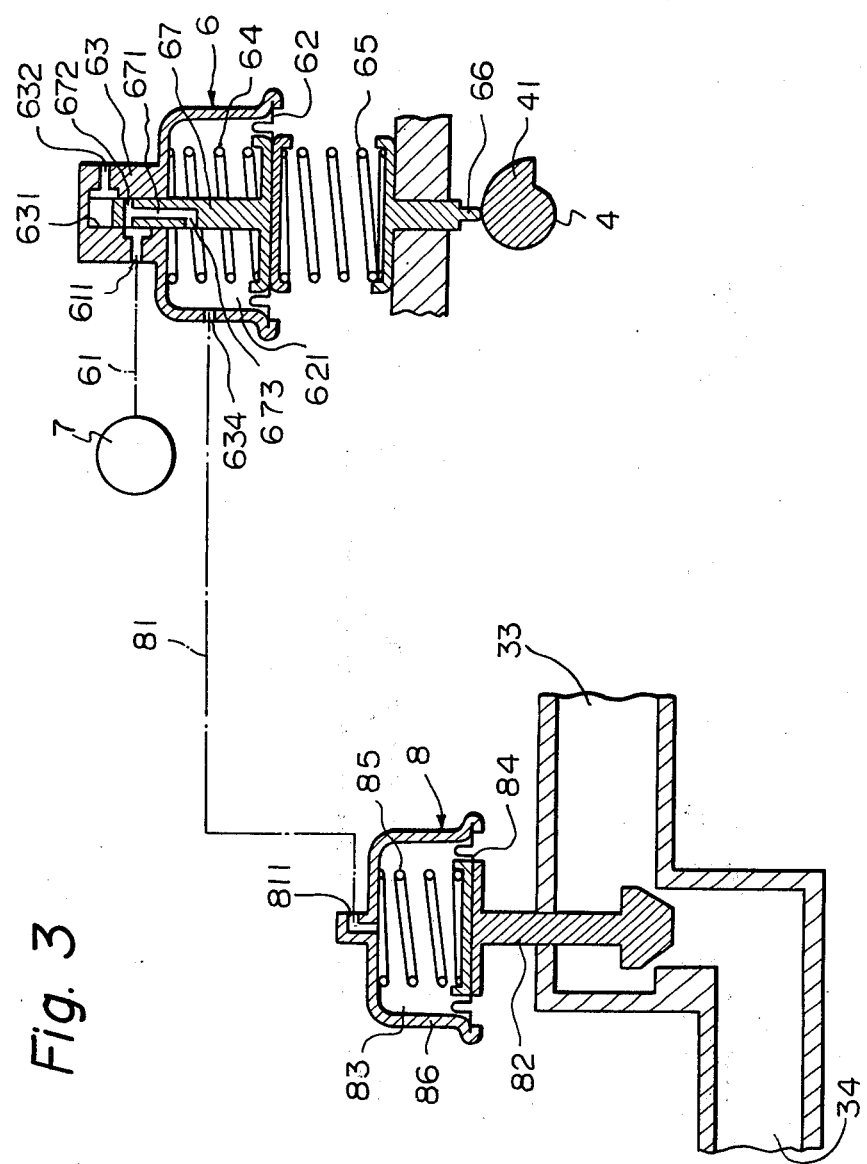
FIG. 3 illustrates an apparatus for controlling the EGR in a diesel engine according to an embodiment of the present invention.

An apparatus for controlling the EGR in a diesel engine according to an embodiment of the present invention is illustrated in FIG. 3. The main constituents of the EGR control apparatus of FIG. 3 are an EGR valve 8 provided in the EGR paths 33 and 34 connected to the air intake manifold and the gas exhaust manifold of a diesel engine; a pressure controlling valve 6; a rotational shaft 4 for regulating the fuel amount; and a vacuum pump 7.

The EGR valve 8 comprises a valve shaft 82, a diaphragm chamber 83, a diaphragm 84, a spring 85, a casing 86, and a port 811 connected to a path 81 to the pressure controlling valve 6.

The valve shaft 82 is moved upward or downward coupled with diaphragm 84. When the lift of the valve shaft 82 is zero, the EGR path 34 through 33 is shut. Diaphragm 84 and casing 86 form diaphragm chamber 83 which is supplied with negative pressure from the pressure controlling valve 6. The negative pressure causes diaphragm 84 to lift valve shaft 82 against the resilient force of the spring 85.

The pressure controlling valve 6 comprises a valve shaft 67, a casing 63, a first spring 64, a second spring 65, and a cam follower 66. A cylinder 631 is provided in the upper portion of the casing 63, in which cylinder the head of the valve shaft 67 slides up and down. An atmospheric port 632 open to the atmosphere and a negative pressure port 611 in communication with the vacuum pump 7 through a vacuum path 61 are provided in the pressure controlling valve 6. The atmospheric port 632 is situated above the negative pressure port 611.

A channel 671 is provided in the valve shaft 67. The upper opening 672 of the channel 671 is adapted to communicate with either the port 611 or the atmospheric port 632. The lower opening 673 of the channel 671 is open to the diaphragm chamber 621.

The diaphragm chamber 621 is formed by the casing 63 and the diaphragm 62. The diaphragm chamber 621 is adapted to be connected to the atmosphere through the lower opening 673, the channel 671, the upper opening 672, and the atmospheric port 632. The diaphragm chamber 621 is also adapted to be connected to the negative pressure source 7 through the lower opening 673, the channel 671, the upper opening 672, and the port 611.

Whether the diaphragm chamber 621 is connected to the atmosphere or the negative pressure source is determined by the lift of the valve shaft 67. The valve shaft 67 is moved up and down, being coupled with the diaphragm 62. When the lift of the valve shaft 67 is zero, only negative pressure is introduced into the diaphragm chamber 621. When the lift of the valve shaft 67 is maximum, only atmospheric pressure is introduced into the diaphragm chamber 621. When the lift of the valve shaft 67 is medium, both negative pressure and atmospheric pressure are introduced into the diaphragm chamber 621.

The valve shaft 67 is forced upward against the resilient force of the first spring 64 to maintain a certain lift. When the negative pressure of the diaphragm chamber 621 is increased, the lift of the valve shaft 67 is increased. Atmospheric pressure is then introduced into the diaphragm chamber 621, and the negative pressure of the diaphragm chamber 621 is reduced. Thus, the negative pressure of the diaphragm chamber 621 is maintained to the value determined by the preset loading of the first spring 64. The thus maintained negative pressure is transmitted through the port 634 of the casing 63 and through the path 81 to the diaphragm chamber 83 of the EGR valve 8. The second spring 65 is used to determine the preset loading of the first spring 64. The preset loading of the second spring 65 is determined by the lift of the cam follower 66. The lift of the cam follower 66 is determined by the cam 41.

The cam 41 is adapted to rotate around the central shaft 4 of a fuel regulating lever of a fuel injection pump maintaining the same phase relationship with the degree of opening of the fuel regulating lever. The profile of the cam 41 is selected to satisfy equation (12) of preset loading of the second spring 65.

$$W = -l_3\theta^2 + m_3\theta - n_3 \quad (12)$$

In equation (12), W is the preset loading of the first spring and the second spring in kg; $\theta$ is the degree of opening of the fuel regulating lever of the fuel injection pump in degrees, corresponding to the phase of cam 41; $n_3$ is a constant; and $l_3$, $m_3$ are constants having the relationship (13);

$$l_3/m_3 = (R_0/4G) \cdot a_3 \quad (13)$$

wherein $R_0$ is the stoichiometrical air-fuel ratio of the fuel having a value between 14 and 15, $a_3$ is a constant having a value between 2.5 and 3.6, and G is an amount of the intake gas per revolution of the engine in g/rev, G being treated as a constant.

During the running of the diesel engine, if the fuel regulating lever of the fuel injection pump is opened widely to increase the amount of the injected fuel, cam 41 is caused to rotate in the counterclockwise direction, thereby raising cam follower 66. The rise of the cam follower 66 presses the second spring 65. This increases the preset loading of the second spring 65, as calculated according to equation (12), above, to increase preset lift of the valve shaft 67. Thus, communication between the upper opening 672 of the valve shaft 67 and the atomospheric port 632 of the cylinder 631 is established at a lower negative pressure than in the former state and, hence, the pressure of the diaphragm chamber 621 is maintained at a less negative pressure than in the former state.

At this moment, the negative pressure P is represented by equation (14);

$$P = l_2'\theta^2 - m_2'\theta + n_2' \quad (14)$$

In the equation (14), P is the negative pressure of the diaphragm chamber 621 in kg/cm$^2$; $l_2'$ and $m_2'$ are constants having the relationship (15);

$$l_2'/m_2' = (R_0/4G) \cdot a_3 \quad (15)$$

and $n_2'$ is a constant.

As a result, the negative pressure existing in the diaphragm chamber 83 of the EGR valve 8 is also represented by equation (14). Accordingly, the lift of the valve shaft 82 of the EGR valve 8 is reduced as the phase $\theta$ of the cam 41 is increased.

Thus, the rate e of EGR is represented by equation (16);

$$e = l_1'\theta^2 - m_1'\theta + n_1' \quad (16)$$

In this regard, constants $l_1'$, $l_2'$, $l_3$, $m_1'$, $m_2'$, $m_3$, $n_1'$, $n_2'$ and $n_3$ are selected so that equation (16) is equivalent to equation (7).

In this way, in the operation of the apparatus of FIG. 3, the amount of fuel F is detected and incorporated into equation (7) to determine the value e for driving the EGR valve and to realize the optimum EGR rate. The EGR valve used has a diaphragm chamber supplied with a pressure P determined from equation (17) based on the amount of fuel F detected;

$$P = l_2F^2 - m_2F + n_2 \quad (17)$$

Said pressure is set using a constant pressure valve of a variable pressure setting regulated by a cam coupled with the shaft of the fuel regulating lever. Said pressure setting of said constant pressure valve is further regulated by a spring with a present loading set with respect to the phase of the cam on the basis of equation (12).

Although in the above-described embodiment, the cam 41 is coupled to the rotational shaft 4 for control of the fuel amount, it is also possible to adopt a system in which the cam is driven by a servomotor. Such a servomotor is operated to maintain the relationship between the amount of fuel and the negative pressure of the diaphragm chamber to satisfy equation (17).

Figure 5:
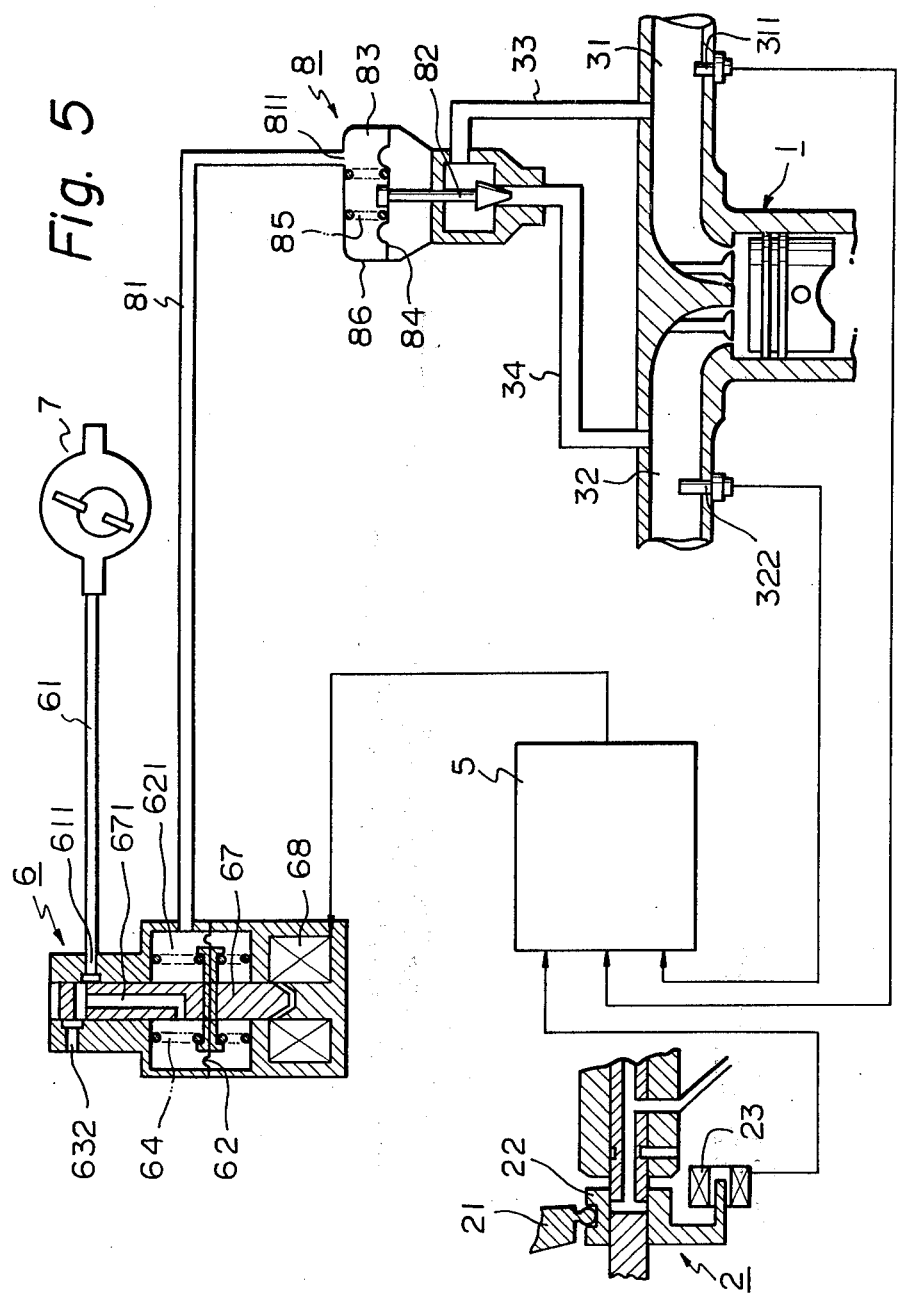
FIG. 5 illustrates an apparatus for controlling the EGR in a diesel engine according to another embodiment of the present invention.

An apparatus for controlling the EGR in a diesel engine according to another embodiment of the present invention is illustrated in FIG. 5.

The main constituents of the EGR control apparatus of FIG. 5 are a diesel engine 1, an air intake manifold 31, a gas exhaust manifold 32, a fuel injection pump 2 of the distribution type, an absolute pressure sensor 311 in the air intake manifold, a sensor 322 for the rate of excessive air in the gas exhaust manifold, a computer device 5, a pressure controlling valve 6, a vacuum pump 7 as a negative pressure source, and an EGR valve 8 receiving the negative pressure from the pressure controlling valve 6.

A spill ring 22 provided in the fuel injection pump 2 is moved, being coupled with the fuel regulating lever 21. The distance of movement of the spill ring 22 determines the amount of fuel injection. This movement of the spill ring is detected by a differential transducer 23 as a change in the electrical signal which is then supplied to the computer device 5. The differential transducer 23 constitutes a fuel amount sensor with the spill ring 22. The absolute pressure sensor 311 provided in the air intake manifold 31 is of a well-known type using, for example, a strain gauge, the output signal of which is also supplied to the computer device 5. The excessive air rate sensor 322 consists of, for example, a zirconia element which detects the concentration of oxygen in the gas exhaust manifold 32 to produce an output signal representing the concentration of oxygen. This output signal is also supplied to the computer device 5.

The computer device 5 carries out the calculation of the equation (18);

$$\lambda(0) = a_4 - a_5 \left( \frac{F}{G_0 \cdot (P/P_0)} \right) \quad (18)$$

In equation (18), $\lambda(0)$ is the rate of excessive air, F is the fuel amount, $G_0$ is the amount of total gas under normal pressure (standard atmospheric pressure), P is the absolute pressure in the air intake manifold, $P_0$ is the absolute pressure in the air intake manifold when the atmospheric pressure is in the standard value, and $a_4$ and $a_5$ are constants.

The $G_0$ is multiplied by $P/P_0$ in equation (18) for the following reason. The intake gas amount G is obtained by multiplying the geometric volume, i.e., stroke volume or displacement, by the volumetric efficiency and gas density. Both the volumetric efficiency and gas density are values which do not significantly vary due to changes in running conditions. Accordingly, under most running conditions, the intake gas amount G can be treated as a constant. One condition under which this is not possible is where the engine is used at a high altitude, where the gas density does change by more than negligible amounts.

The above calculated excessive air rate $\lambda(0)$ is compared with the measured excessive air rate $\lambda$, from the excessive air rate sensor 322, in the computer device 5. If λ(0) is less than λ, computer device 5 supplies an output signal to the negative pressure controlling valve 6 to increase the negative pressure, while if λ is less than λ(0), the computer device 5 supplies an output signal to the negative pressure controlling valve 6 to reduce the negative pressure.

In the pressure controlling valve 6, the coil 68 is energized to change the degree of lift of valve shaft 67, thereby changing the ratio of communication of the atmospheric port 632 and negative pressure port 611 and controlling the negative pressure in the negative pressure chamber 621.

The EGR valve 8 connects the air intake manifold 31 with the gas exhaust manifold 32 and changes the lift of the valve shaft 82 along with the magnitude of the negative pressure of the negative pressure chamber 83. That is, when the negative pressure increases, the cross-section of the EGR valve path is increased so that the amount of EGR is increased. When the negative is reduced, the cross-section of the EGR valve path is reduced so that the amount of EGR is reduced.

Figure 4:
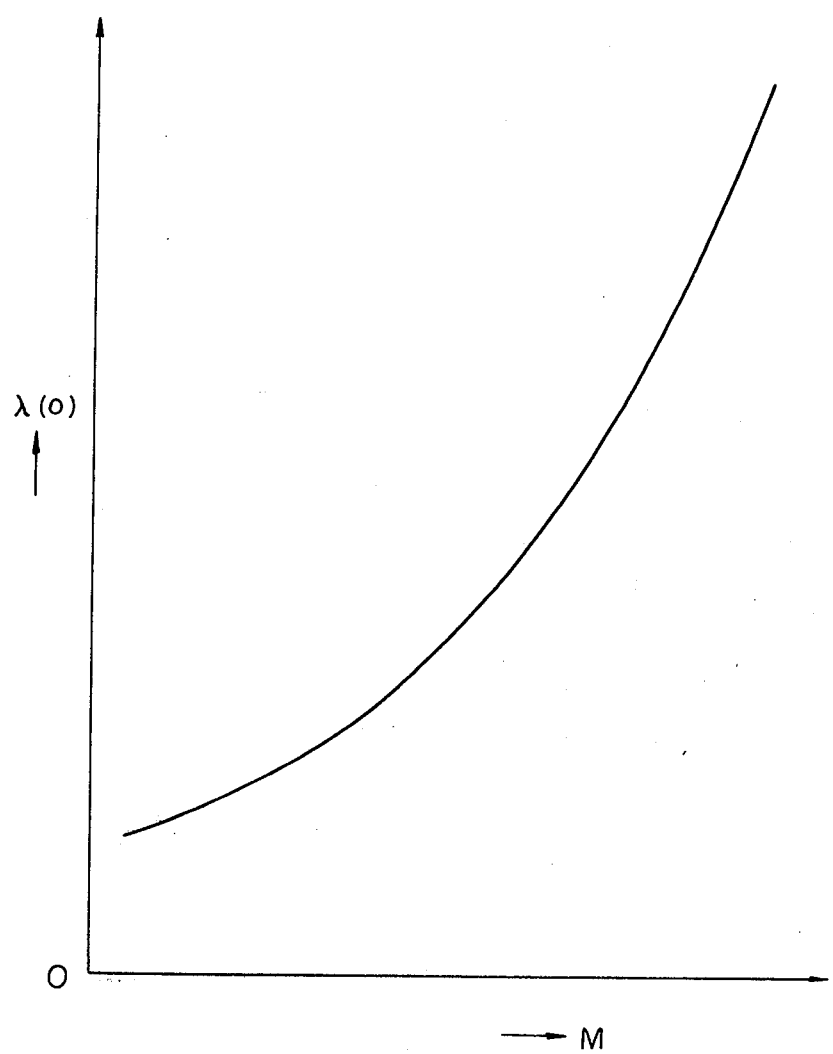
FIG. 4 illustrates the characteristic curve of the relationship between the concentration of oxygen in the gas exhaust manifold and the rate of excessive air.
Figure 6:
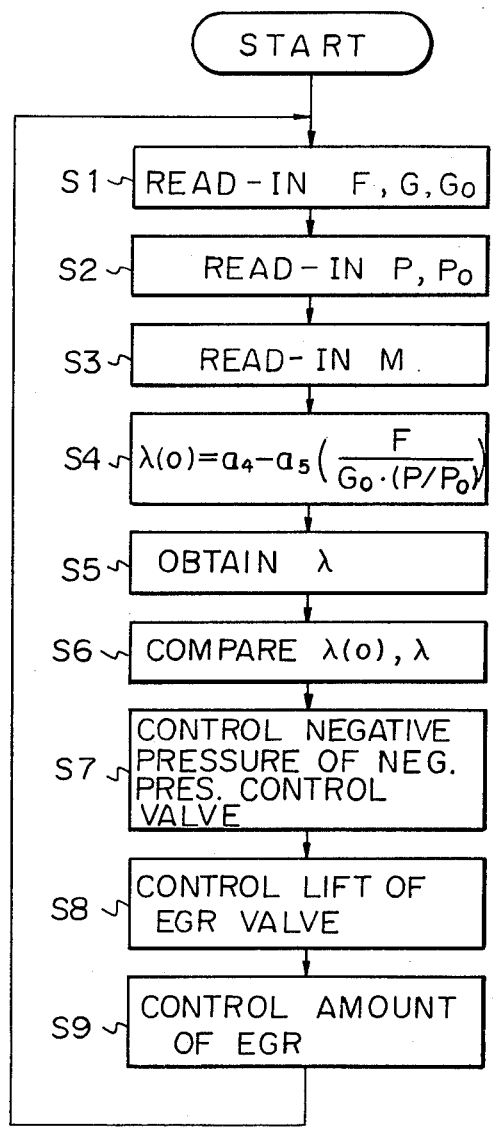
FIG. 6 illustrates a flow chart of the calculation carried out in the computer device in the apparatus of FIG. 5.

A flow chart of the operation of the computer device 5 of FIG. 5 is illustrated in FIG. 6. In steps S1, S2 and S3, the values F, G, $G_0$, P, $P_0$ and M are introduced. M represents the concentration of oxygen in the gas exhaust manifold. In step S4, the rate λ(0) of excessive air is calculated by equation (18). In step S5, the actual rate λ of the excessive air is obtained from the relationship between M and $λ_0$, illustrated in FIG. 4.

In step S6, the thus obtained λ(0) and λ are compared. If λ(0) is less than λ, the energization of the coil 68 of the negative pressure controlling valve 6 is increased to increase the resulting negative pressure. If λ is less than λ(0), the energization of the coil 68 is reduced to reduce the resulting negative pressure.

It is possible to adopt modifications of the embodiment illustrated in FIG. 5. When using a series type fuel injection pump or other type of rack control, for example, the fuel amount F may be detected from the position of the control rack. The fuel amount F may also be detected from the degree of opening of the acceleration lever. In the control of the negative pressure, it is possible to adapt a valve driven by an electric motor, or adopt one or two electromagnetic valves of the on-off type (vaccum switching valve).

Figure 7:
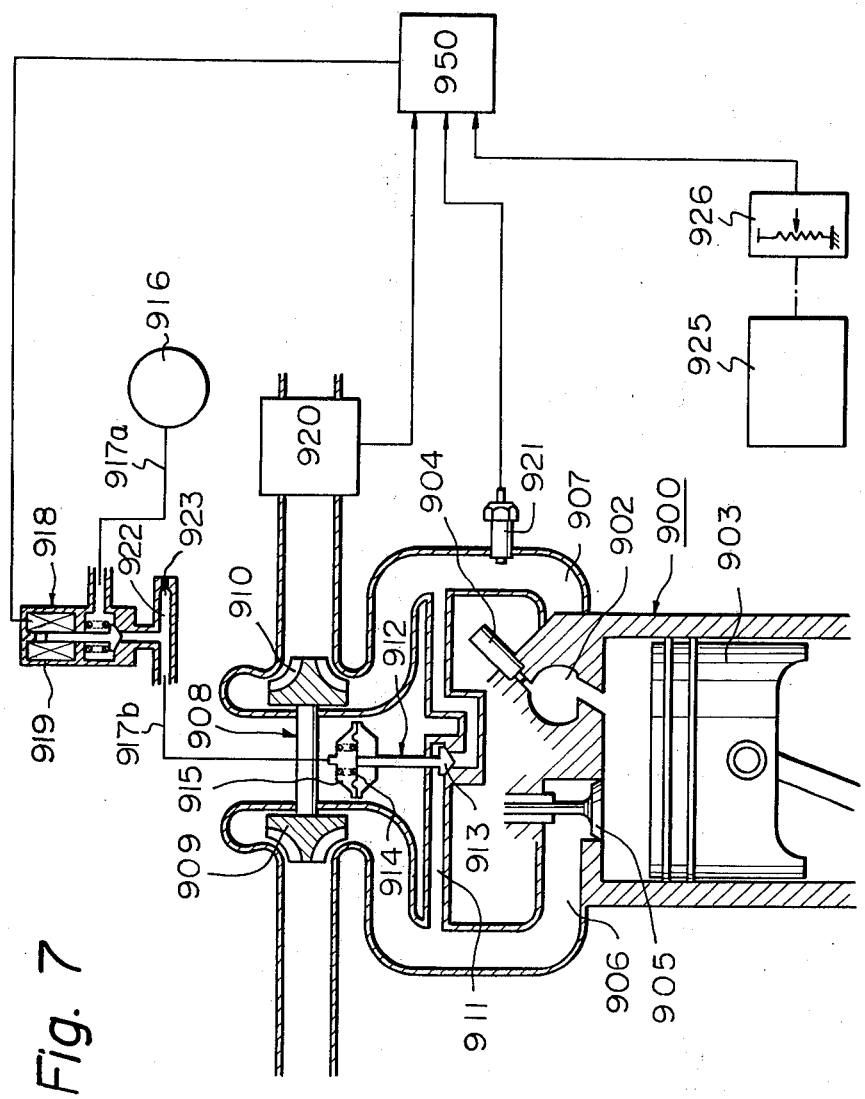
FIG. 7 illustrates an apparatus for controlling the EGR in a diesel engine having a turbocharger according to another embodiment of the present invention.

An apparatus for controlling the EGR in a diesel engine having a turbocharger according to another embodiment of the present invention is illustrated in FIG. 7. The apparatus of FIG. 7 comprises a diesel engine 900 having a swirl chamber 902, an air intake manifold 907, a fuel injection valve 904, a gas exhaust valve 905, and a gas exhaust manifold 906. The apparatus of FIG. 7 also comprises a turbocharger 908 having a compressor 910 and a turbine 909. The apparatus of FIG. 7 further comprises an EGR path 911 and an EGR valve 912 provided in the EGR path. The EGR path is connected between the upstream side of the turbine 909 of the gas exhaust manifold 906 and the downstream side of the compressor 910 of the air intake manifold 907.

The lift of the valve shaft 913 of the EGR valve 912 is determined by the value of the negative pressure of the diaphragm chamber 915 formed by the casing of the EGR valve and the diaphragm 914 coupled to the valve shaft 913. The negative pressure of the vacuum pump 916 is introduced to the diaphragm chamber 915 through a negative pressure path 917a, a three-way electromagnetic valve 918, and a negative pressure path 917b. The three-way electromagnetic valve 918 is inserted between the negative pressure paths 917a and 917b. One exit path 922 of the electromagnetic valve 918 is open to the atmosphere through an orifice 923. When the coil 919 of the electromagnetic valve 918 is not energized, the diaphragm chamber 915 is shut from the vacuum pump 916. When the coil 919 is energized, the diaphragm chamber 915 is connected with the vacuum pump 916.

The computer device 950 supplies an output signal having a selected duty ratio to the coil 919. If the duty ratio of the output signal is zero, the lift of the valve shaft 913 is zero, whereby no EGR takes place. If the duty ratio of the output signal is 100%, the lift of the valve shaft 913 is maximized, whereby maximum EGR takes place.

The computer device 950 determines the appropriate duty ratio through calculations based on signals received from the air flow meter 920, the intake air pressure sensor 921, and the sensor 926 for the degree of opening of the acceleration lever. The air flow meter 920 is located upstream of the compressor 910 in the air intake manifold. The intake air pressure sensor 921 is located downstream of the compressor 910. The sensor 926 for the degree of opening of the acceleration lever is coupled to the acceleration lever of the fuel injection pump 925.

The computer device 950 calculates the amount H(0) of the intake air per revolution of the engine in g/rev from equation (19);

$$H(0) = a_6 F - a_8 F^2 \tag{19}$$

In equation (19), H(0) is the amount of the intake air per revolution of the engine in g/rev; F is the fuel amount per revolution of the engine in g/rev, and $a_6$ and $a_8$ are constans. The constant $a_6$ is calculated by equation (20).

$$a_6 = a_7 \cdot R_0 \tag{20}$$

In equation (20), $a_7$ is a constant between 2.5 and 3.6, and $R_0$ is a stoichiometrical air-fuel ratio between 14 and 15. The constant $a_8$ in equation (19) is calculated by equation (21).

$$a_8 = (a_7^2/4) \cdot R_0^2 \cdot (1/G) \tag{21}$$

In equation (21), G is the intake gas amount per revolution of the engine under typical running conditions, a constant for individual engines.

When an engine is used at high altitudes or has a supercharger, however, the change of the density of the gas cannot be neglected, hence equation (19) should be modified to equation (22).

$$H(0) = a_6 F - a_9 \cdot (F^2/P) \tag{22}$$

In equation (22), $a_9$ is a constant calculated by equation (23).

$$a_9 = (a_7^2/4) \cdot R_0^2 \cdot (P/G) \tag{23}$$

After H(0) is calculated based on equation (19) or (22), the computer device 950 compares the calculated H(0) with the intake air amount H per revolution of the engine detected by the air flow meter 920.

If H(0) is greater than H, the computer device 950 increases the duty ratio of the output signal supplied to the coil 919 of the electromagnetic valve 918. This increases the negative pressure introduced into the diaphragm chamber 915 of the EGR valve 912 and, hence, the lift of the valve shaft 913 and the amount of EGR. The increase in the amount of EGR is accompanied by a corresponding decrease in the amount of the intake air. When the amount H of intake air becomes equal to H(0) of equation (12), the optimum amount of EGR is attained and the computer device 950 stops increasing the duty ratio.

If H(0) is less than H, the computer device 950 reduces the duty ratio of the output signal supplied to the coil 919 of the electromagnetic valve 918. This reduces the negative pressure introduced into the diaphragm chamber 915 of the EGR valve 912 and, hence, the lift of the valve shaft 913 and the amount of EGR. The decrease in the amount of EGR is accompanied by a corresponding increase in the amount of the intake air. When the amount H of intake air becomes equal to H(0) of equation (22), the optimum amount of the EGR is attained and the computer device 950 stops reducing the duty ratio.

It is possible to adopt modifications of the embodiment illustrated in FIG. 7. For example, a sensor may be provided, to detect the temperature of the gas in the air intake manifold and the value of the amount of the intake gas may be corrected accordingly. Also, the fuel amount may be detected from the position of the control rack or the position of the spill ring of fuel injection pumps. A differential transducer may be used for detecting the position of such a rack or spill ring.

We claim:

1. A method for controlling exhaust gas recirculation (EGR) in an internal combustion engine, comprising an EGR valve, means for driving said EGR valve, and means for detecting the fuel amount, wherein said EGR valve is driven by said driving means with the rate of EGR determined by the following equation:

$$e = \left(\frac{25 \times R_0^2}{G^2} \cdot a_1^2\right) \cdot F^2 - \left(\frac{100 \times R_0}{G} \cdot a_1\right) \cdot F + 100$$

where e is the rate of EGR in %;

F is the fuel amount of per revolution of the engine in g/rev;

$R_0$ is a constant between 14 and 15 as the stoichiometrical air-fuel ratio of the fuel;

G is the intake gas amount per revolution of the engine under typical running conditions in g/rev; and $a_1$ is a constant between 2.5 and 3.6.

2. A method as defined in claim 1, wherein said internal combustion engine comprises means for supplying pressure to said EGR valve and means for regulating said pressure supplied to said EGR valve; said EGR valve comprises a diaphragm chamber to which the pressure of said pressure supplying means is introduced, wherein said pressure regulating means is operated to provide the pressure determined by the following equation:

$$P = l_2 F^2 - m_2 F + n_2$$

where

P is positive or negative pressure in kg/cm$^2$;

F is the fuel amount per revolution of the engine in g/rev;

$n_2$ is a positive constant; and $l_2$ and $m_2$ are positive constants having the following relationship:

$$l_2/m_2 = (R_0/4G) \cdot a_3$$

where $R_0$ is a constant between 14 and 15 as the stoichiometrical air-fuel ratio of the fuel, G is the intake gas amount per revolution of the engine under typical running conditions in g/rev, and $a_3$ is a constant between 2.5 and 3.6.

3. A method as defined in claim 1, wherein said internal combustion engine comprises means for supplying pressure to said EGR valve, a constant pressure valve means for maintaining said pressure at a predetermined value, spring means having a preset loading for determining the selected pressure of said constant pressure valve means, and cam means for regulating the preset loading of said spring means, wherein the phase of said cam corresponds to the phase of a fuel amount selecting device of said engine and is determined by the following equation:

$$W = -l_3 \theta^2 + m_3 \theta - n_3$$

where

W is the preset loading of the spring in kg;

$\theta$ is the phase of the cam in degrees, $n_3$ is a constant; and $l_3$ and $m_3$ are constants having the following relationship:

$$l_3/m_3 = (R_0/4G) \cdot a_3$$

where $R_0$ is a constant between 14 and 15 as the stoichiometrical air-fuel ratio of the fuel, G is the intake gas amount per revolution of the engine under typical running conditions in g/rev, and $a_3$ is a constant between 3.5 and 3.6.

4. An apparatus for controlling the EGR in an internal combustion engine, comprising an EGR valve having a diaphragm chamber, a path for supplying pressure to said diaphragm chamber, a constant pressure valve for maintaining the pressure supplied to said diaphragm chamber at a selected value, means for detecting the fuel amount, a cam driven by the axis of the fuel regulating lever of a fuel injection pump, a cam follower actuated by said cam, and a first and a second spring inserted between said cam follower and the valve shaft of said constant pressure valve, the preset loading of said first spring being determined by the preset loading of said second spring, wherein the profile of said cam is determined by the following equation:

$$W = -l_3 \theta^2 + m_3 \theta - n_3$$

where

W is the preset loading in kg;

$\theta$ is the phase of the cam in degrees;

$n_3$ is a constant; and $l_3$ and $m_3$ are constants having the following relationship:

$$l_3/m_3 = (R_0/4G) \cdot a_3$$

where
- $R_0$ is a constant between 14 and 15 as the stoichiometrical air-fuel ratio of the fuel,
- G is the intake gas amount per revolution of the engine under typical running conditions in g/rev, and
- $a_3$ is a constant between 2.5 and 3.6.

5. A method for controlling the EGR in an internal combustion engine, comprising means for detecting the rate of the excessive air, means for detecting the fuel amount, means for detecting the amount of the total gas, and means for controlling the amount of the EGR, wherein said control of the amount of the EGR is carried out so that the rate of the excessive air is determined by the following equation:

$$\lambda(0) = a_4 - a_5(F/G)$$

where
- $\lambda(0)$ is the rate of the excessive air,
- F is the fuel amount of per revolution of the engine in g/rev;
- G is the intake gas amount per revolution of the engine under typical running conditions in g/rev; and
- $a_4$ and $a_5$ are predetermined constants.

6. A method as defined in claim 5, wherein an absolute pressure sensor is used as said means for detecting the amount of the entire gas.

7. A method for controlling the EGR in an internal combustion engine, comprising an EGR valve, means for detecting the fuel amount, and means for detecting the intake air amount, wherein said EGR valve is controlled so that the intake air amount is determined by the following equation:

$$H = a_6 F - a_8 F^2$$

where
- H is the intake air amount per revolution of the engine in g/rev;
- F is the fuel amount per revolution of the engine in g/rev; and
- $a_6$ and $a_8$ are constants having the following relationships:

$$a_6 = a_7 \cdot R_0$$

$$a = (a_7^2/4) \cdot R_0^2 \cdot (1/G)$$

where
- $R_0$ is a constant between 14 and 15 as the stoichiometrical air-fuel ratio of the fuel,
- G is the intake gas amount per revolution of the engine under typical running conditions in g/rev, and
- $a_7$ is a constant between 2.5 and 3.6.

8. A method for controlling the EGR in an internal combustion engine, comprising an EGR valve, means for detecting the fuel amount, means for detecting the intake air amount, and means for detecting the pressure of the air intake manifold, wherein said EGR valve is controlled so that the intake air amount is determined by the following equation:

$$H = a_6 F - a_9 \cdot F^2 / P$$

where
- H is the intake air amount per revolution of the engine in g/rev;
- F is the fuel amount per revolution of the engine in g/rev; and
- $a_6$ and $a_9$ are constants having the following relationships:

$$a_6 = a_7 \cdot R_0$$

$$a_9 = (a_7^2/4) \cdot R_0^2 \cdot (P/G)$$

where
- $R_0$ is a constant between 14 and 15 as the stoichiometrical air-fuel ratio of the fuel,
- P is the pressure of the air intake manifold in kg/cm$^2$,
- G is the intake gas amount per rotation of the engine under typical running conditions in g/rev, and
- $a_7$ is a constant between 2.5 and 3.6.

* * * * *

UNITED STATES PATENT AND TRADEMARK OFFICE
CERTIFICATE OF CORRECTION

PATENT NO. : 4,411,242

DATED : October 25, 1983

INVENTOR(S) : Toshihiko IGASHIRA et al

It is certified that error appears in the above-identified patent and that said Letters Patent is hereby corrected as shown below:

Column 9, line 8, change "equation (12)" to --equation (22)--

Signed and Sealed this

Eighteenth Day of December 1984

[SEAL]

Attest:

GERALD J. MOSSINGHOFF

Attesting Officer     Commissioner of Patents and Trademarks